(12) United States Patent
Gollier et al.

(10) Patent No.: US 10,394,040 B2
(45) Date of Patent: Aug. 27, 2019

(54) HEAD MOUNTED DISPLAY INCLUDING PANCAKE LENS BLOCK

(71) Applicant: Facebook Technologies, LLC, Menlo Park, CA (US)

(72) Inventors: Jacques Gollier, Redmond, WA (US); Wai Sze Tiffany Lam, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 68 days.

(21) Appl. No.: 15/292,108

(22) Filed: Oct. 12, 2016

(65) Prior Publication Data

US 2018/0101020 A1    Apr. 12, 2018

(51) Int. Cl.
| | |
|---|---|
| *G02B 5/30* | (2006.01) |
| *G06F 3/01* | (2006.01) |
| *G02B 27/02* | (2006.01) |
| *G02B 27/28* | (2006.01) |
| *G06T 19/00* | (2011.01) |

(52) U.S. Cl.
CPC ......... *G02B 27/283* (2013.01); *G02B 5/3083* (2013.01); *G02B 27/022* (2013.01); *G02B 27/286* (2013.01); *G06F 3/012* (2013.01); *G06T 19/006* (2013.01)

(58) Field of Classification Search
CPC .. G02B 27/0025; G02B 27/01; G02B 27/017; G02B 27/0172; G02B 27/0179; G02B 27/10; G02B 27/14; G02B 27/142; G02B 27/28; G02B 27/283; G02B 27/286; G02B 27/288; G02B 5/30; G02B 5/3083; G02B 2027/011; G02B 2027/0118; G02B 2027/012; G02B 2027/0121; G02B 2027/0132; G02B 2027/0134; G02B 2027/0136

See application file for complete search history.

(56) References Cited

U.S. PATENT DOCUMENTS

| | | | | |
|---|---|---|---|---|
| 5,973,760 | A  * | 10/1999 | Dehmlow | G02B 5/3083 345/7 |
| 2007/0070508 | A1* | 3/2007 | Ruhle | G02B 5/3016 359/630 |
| 2017/0068096 | A1* | 3/2017 | Ouderkirk | B29D 11/00644 |

* cited by examiner

*Primary Examiner* — Stephone B Allen
*Assistant Examiner* — Adam W Booher
(74) *Attorney, Agent, or Firm* — Fenwick & West LLP

(57) ABSTRACT

A head mounted display (HMD) includes a display and a pancake lens block. The display with a circular polarizer, comprised of an initial linear polarizer and a first quarter-waveplate with polarizer transmission axis 45° from the waveplate fast axis, emits polarized light. The pancake lens includes a partial reflector, a second quarter-waveplate, and a beam splitting polarizer. The pancake lens receives polarized light from the display. Light propagating through the pancake lens undergoes multiple reflections and transmissions achieved by coordinating changes in polarization of light through these optical elements. To mitigate parasitic light from degrading image quality of the HMD, the fast axis orientation of the first quarter-waveplate is oriented 90° relative to the fast axis orientation of the second quarter-waveplate, and thus the transmission axis of the first polarizer is oriented 90° relative to the transmission axis of the beam splitting polarizer.

19 Claims, 10 Drawing Sheets

HEAD MOUNTED DISPLAY INCLUDING PANCAKE LENS BLOCK

BACKGROUND

The present disclosure generally relates to enhancing images from electronic displays, and specifically to reducing light leakage within an optical system of electronic displays.

In a head-mounted display (HMD) a user's eye occupies a region of space generally referred to as an eye box (typically there is a respective eye box for a left and a right eye of the user). The HMD displays and directs content to the eye boxes. In some conventional systems multiple optical elements direct the content to the eye boxes, and light can be reflected in between optical elements and parasitic reflections can lead to poor contrast in the content being presented to the user. In particular, systems with multiple polarizing elements, which if not handled correctly can result in parasitic light and/or ghost images that can dramatically reduce overall image quality.

Additionally, as a user moves their eye within an eye box and/or the position of the HMD changes relative to the position of the user's head, the location of the user's eye within an eye box may change. Changes in the location of the eye within an eye box may result in distortions in the content being presented to the user. This effect is known as pupil swim, and it can be a problem for HMDs for various reasons including, e.g., increased calibration difficulty, and motion sickness due to problems with vertical disparity. Conventional approaches for reducing pupil swim add complexity to HMDs.

SUMMARY

A head mounted display (HMD) comprises an electronic display and a pancake lens block to alter the display image light to a user wearing the HMD. The pancake lens block, in one embodiment, comprises a back partly reflective optical element and a front polarization sensitive reflective optical element. The back partly reflective optical element includes a back first surface and a back second surface, the back first surface configured to receive the image light and the back second surface configured to output altered image light. The front optical element includes a front first surface and a front second surface, the front second surface coupled to the back second surface such that the back optical element and the front optical element. A first portion of the altered image light is reflected by a surface of the front optical element toward the back curved optical element and a surface of the back optical element reflects a second portion of the first portion of the altered image light back to the front optical element for transmission to an exit pupil of a user wearing the HMD. The pancake lens block mitigates field curvature and accordingly acts to reduce pupil swim.

The pancake lens block, in a separate embodiment, comprises a back quarter-waveplate oriented to a first axis of orientation, a partially reflective optical element, a front quarter-wave plate oriented to a second axis of orientation that is orthogonal to the first axis of orientation, and a polarization sensitive reflective optical element. The back quarter-waveplate is configured to transmit light received from an electronic display to the partially reflective optical element. The partially reflective optical element receives the light from the back quarter-waveplate, transmits a portion of the light, and reflects another portion of light. The transmitted portion is received by the front quarter-wave plate, which changes the polarization state of and transmits the portion of the light to the polarization sensitive reflective optical element. The polarization sensitive reflective optical element is configured to reflect the portion of the light transmitted by the front quarter-wave plate back to the partially reflective optical element based on the polarization state of the portion of the light. Accordingly, the partially reflective optical element reflects a second portion of the light back to the polarization sensitive reflective optical element (while transmitting another portion). The polarization sensitive reflective optical element transmits the second portion of the light to an exit pupil of the HMD based on a second polarization state of the second portion of the light.

The various reflections and transmissions are achieved by coordinating changes in the polarization of light being emitted from the electronic display through the various optical elements and/or surface layers described above. Many of these optical elements are, thus, wavelength and/or angularly sensitive and imperfections in one or more of these optical elements or surface layers may cause some light to be unintentionally transmitted to the eye by the front polarization reflective optical element in the light's first pass instead of being reflected. This unintentionally transmitted light causes ghost images and other undesirable effects which can dramatically reduce image quality of the HMD and the image contrast. Thus, in order to mitigate this unintentionally transmitted light, an axis of orientation (e.g., a fast axis) of a first quarter-waveplate is oriented 90° relative to an axis of orientation of a second quarter-waveplate. Consequently, the transmission axis of a first polarizer and the transmission axis of a second polarizer (beam splitting polarizer) of the pancake lens block are oriented 90° relative to each other. Accordingly, the two quarter-waveplates have similar behaviors in term of retardance variation versus wavelength and incidence angle and mitigate leakage of light between the two quarter-waveplates that can otherwise occur as the wavelength of the light varies.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A pancake lens block includes an optional first polarizer, a first quarter-waveplate, a partially reflective mirror, a second quarter-waveplate, and a second polarizer which is a beam splitting polarizer. An axis of orientation for the first quarter-waveplate is oriented 90° relative to an axis of orientation of the second quarter-waveplate. Consequently, a transmission (or polarization) axis of the first polarizer and the transmission axis of the second polarizer are oriented 90° relative to each other. Here, the axis of orientation of the quarter-waveplates can be the fast axis ($n_e$) or the slow axis ($n_o$) or some other axis by which the waveplates are oriented relative to each other. The two waveplates additionally exhibit the same or similar behavior with respect to retardance variation versus wavelength and incidence angle.

A Pancake Lens

Figure 1:
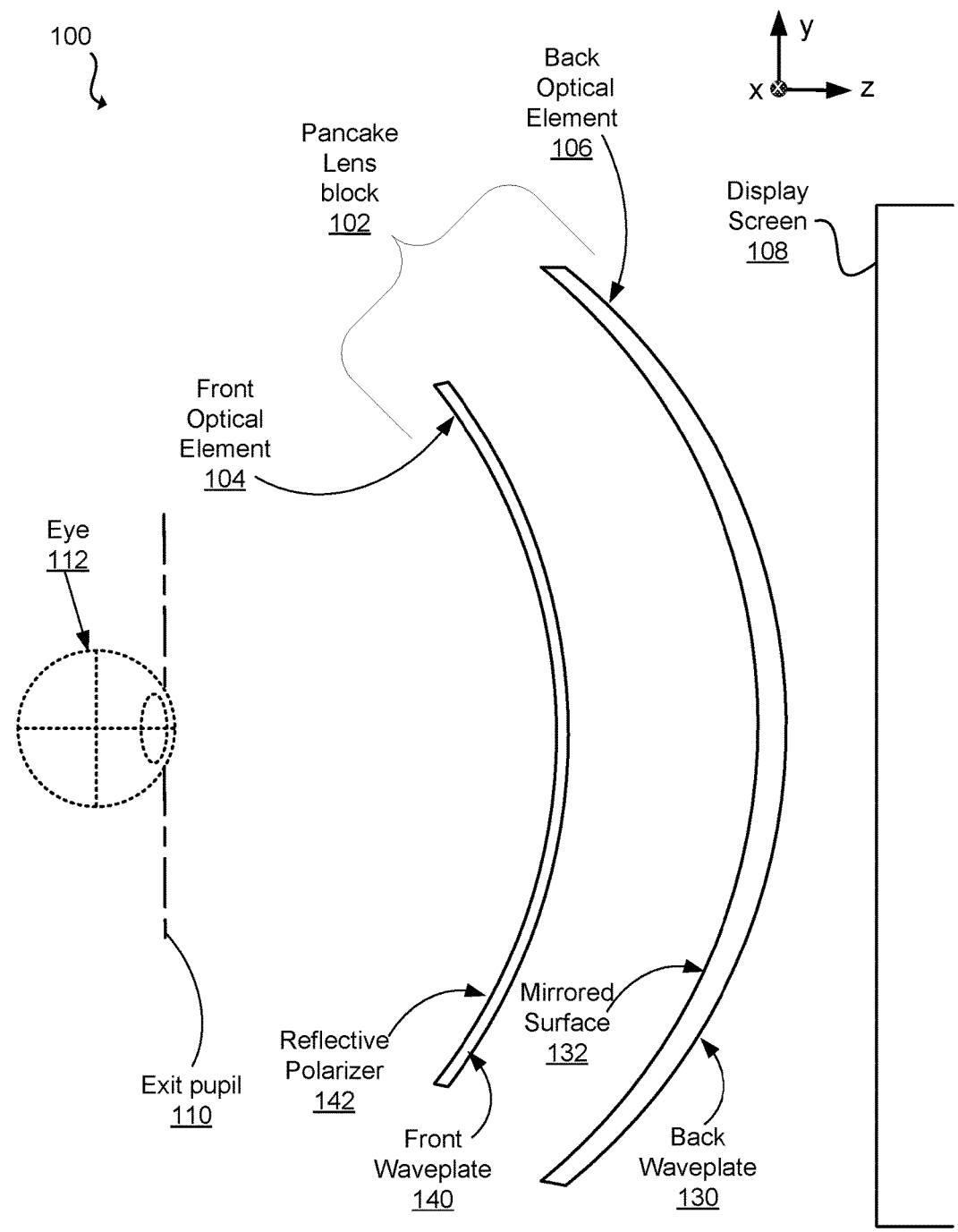
FIG. 1 is an example pancake lens block, in accordance with one embodiment.

FIG. 1 is a cross section 100 of an embodiment of pancake lens block 102 (PLB 102), in accordance with an embodiment. PLB 102 produces a folded optical path by utilizing polarizing optical components and provides sufficient optical power in a compact system. PLB 102, in some embodiments, is part of a head mounted display (HMD) and includes front optical element 104 and back optical element 106 that focuses light from electronic display screen 108 to exit pupil 110 where eye 112 of a user is positioned when viewing content on electronic display screen 108. For purposes of illustration, FIG. 1 shows a cross section 100 of PLB 102 associated with a single eye 112, but another pancake lens assembly, separate from PLB 102 shown in FIG. 1, can provide altered image light to another eye of the user. Some embodiments of the pancake lens have different components than those described here. Similarly, in some cases, functions can be distributed among the components in a different manner than is described here.

Light emitted from electronic display 108 is linearly polarized. In some embodiments, electronic display 108 includes one or more linear polarizers (POL1) that linearly polarized light emitted from electronic display 108. Alternatively, light emitted from light emitting components (e.g., LEDs) is emitted as linearly polarized light.

PLB 102 includes front optical element 104 and back optical element 106. One or more surfaces of front optical element 104 and back optical element 106 are shaped to correct for field curvature. One or more surfaces of front optical element 104 may be shaped to be spherically concave (e.g., a portion of a sphere), spherically convex, plane, a rotationally symmetric asphere, a freeform shape, or some other shape that mitigates field curvature. In some embodiments, the shape of one or more surfaces of front optical element 104 and back optical element 106 are designed to additionally correct for other forms of optical aberration. In some embodiments, one or more of the optical elements within PLB 102 may have one or more coatings, such as anti-reflective coatings, to reduce ghost images and enhance contrast.

Back optical element 106 includes back waveplate 130 and mirrored surface 132. In this example, back waveplate 130 is a quarter-waveplate that shifts polarization of received light. A quarter-waveplate has a polarization axis oriented at 45 degrees relative to incident linearly polarized light such that back waveplate 130 converts linearly polarized light into circularly polarized light. Likewise, a quarter-waveplate converts circularly polarized light to linearly polarized light. Quarter-waveplates are usually made of birefringent materials such as quartz, organic material sheets, or liquid crystal. In one embodiment, the quarter-waveplates are designed to be optimized such that the dependence of the retardance induced by the plate remains close to a quarter of a wave independently of the wavelength and the angle of incidence. Mirrored surface 132 is partially reflective to reflect a portion of the received light. In some embodiments, mirrored surface 132 is configured to transmit 50% of incident light and reflect 50% of incident light.

Front optical element 104 includes front waveplate 140 and reflective polarizer 142. Front waveplate 140 is also a quarter-waveplate and reflective polarizer 142 is a polarization sensitive partially reflective mirror configured to reflect received light of a first linear polarization and transmit received light of a second linear polarization. For example, reflective polarizer 142 may be a wire grid polarizer configured to reflect linearly polarized light with a polarization direction in the x-direction, and pass light that is linearly polarized in the y-direction.

Although shown as surfaces of front optical element 104 and back optical element 106 respectively, back waveplate 130 and front waveplate 140 can be separate from optical element 104 and back optical element 106 in some embodiments. For example, back waveplate 130 can be located between mirrored surface 132 and electronic display 108 (e.g., as a freestanding element in air, laminated on the surface of electronic display 108, etc.) and front waveplate 140 also be similarly located anywhere between mirrored surface 132 and reflective polarizer 142. Further, although shown as curved, the individual optical elements that together compose front optical element 104 and back optical element 106 in FIG. 1 can be flat or be a mix of flat and curved elements when separately provided. For example, as separate elements, back waveplate 130 and front waveplate 140 could be provided flat while mirrored surface 132 and reflective polarizer 142 are curved, among other variations. In one embodiment, back waveplate 130 and front waveplate 140 can be of a cylindrical shape.

PLB 102 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of a user's eye within an eyebox results in distortions in the content being presented to the user. Correcting for field curvature mitigates pupil swim. The pancake lens mitigates field curvature in an image that is output to a user's eyes to reduce pupil swim. Additionally, PLB 102 has a small form factor, is relatively low weight compared to other optical systems designed to remove field curvature and is configured to have a wide field of view. The operation of PLB 102 is discussed below with respect to FIG. 2.

Folded Optical Path of a Pancake Lens

Figure 2:
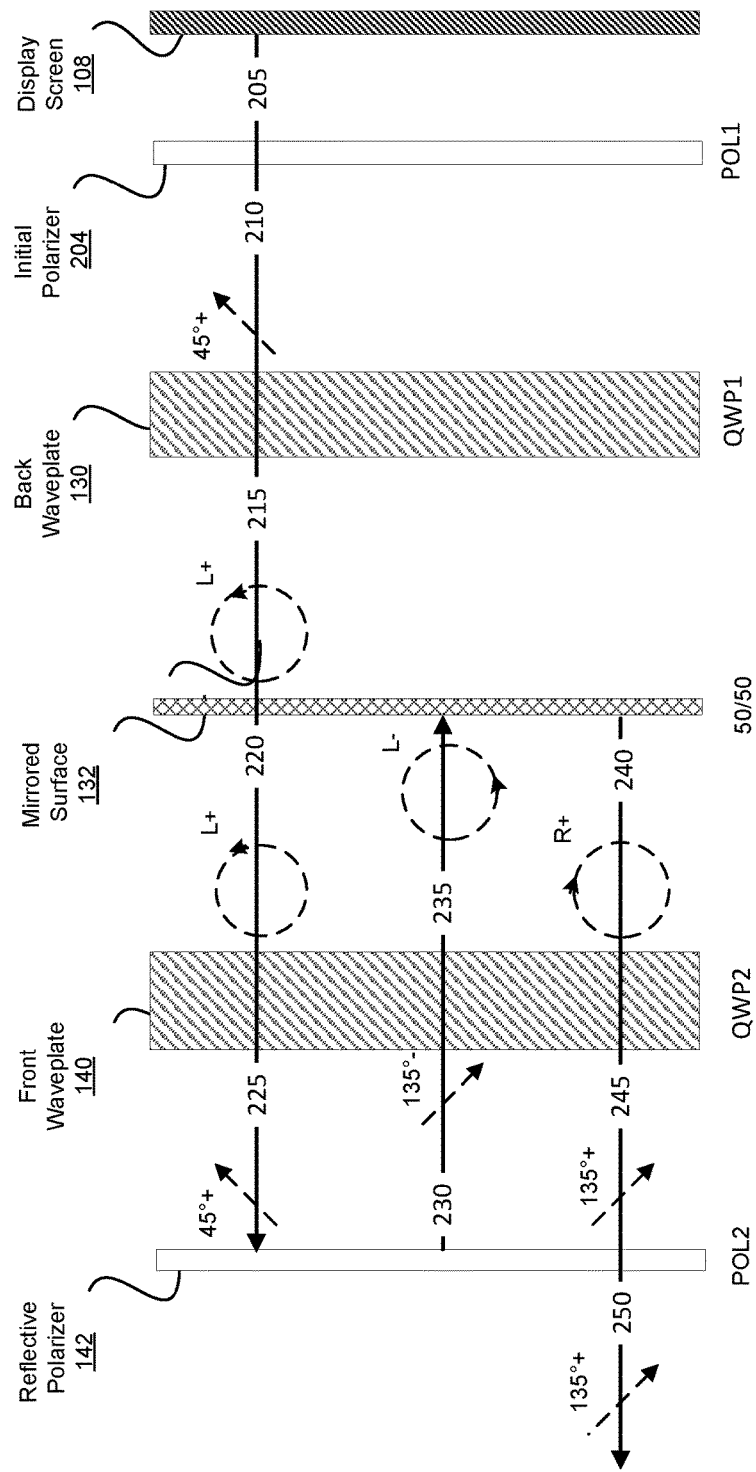
FIG. 2 shows a folded optical path with example polarization states of pancake lens block, in accordance with one embodiment.

FIG. 2 shows a folded optical path of PLB 102, in accordance with one embodiment. Light 205 from electronic display screen 108 is initially polarized via initial polarizer 204 (POL1) to linearly polarized light 210. Note that, in some embodiments, the light emitted by the display is already linearly polarized, in which case POL1 is not needed. Back waveplate 130 (QWP1) is a quarter-waveplate with an axis 45 degrees relative to the direction of polarization of light 210. The orientation of the waveplate axis relative to the incident linearly polarized light controls the handedness and polarization ellipticity of the emitted circularly polarized light. QWP1 changes the polarization of light 210 from linear polarization to circular polarization for the designed wavelength at the designed angle—shown as light 215. The polarization of light 215 may be clockwise or anti-clockwise based on the orientation of the axis of QWP1 relative to incident linearly polarized light.

A first portion of light 215 is reflected by mirrored surface 132, and a second portion of light 220 is transmitted by mirrored surface 132 towards front waveplate 140 (QWP2). In some embodiments, mirrored surface 132 is configured to reflect 50% of incident light (e.g., the light 215). Similarly, QWP2 is a quarter-waveplate and changes the polarization of light 220 from circular to linear (referred to as light 225). Light 225 is incident on reflective polarizer 142 (POL2), which reflects light that is polarized in a blocking direction (e.g., x direction) and transmits light that is polarized in a perpendicular direction (e.g., y-direction). At this point, light 225 is linearly polarized in the blocking direction. Thus, POL2 reflects light 225 and the reflected light is referred to as light 230. Accordingly, light 230 is again incident on QWP2 which changes the linear polarized light 230 to circularly polarized light 235 and mirrored surface 132 reflects a portion of the polarized light 235, as described above. The reflected portion of light 235 is referred to as light 240.

Light 240 is also circularly polarized; however, its handedness is opposite that of light 235 and 220 due to the reflection from mirrored surface 132. Thus, QWP2 changes the polarization of circularly polarized light 240 to linearly polarized light 245. However, as the handedness of the light 240 is opposite to that of light 220, the polarization of light 245 is perpendicular to that of light 225. Accordingly, light 245 is linearly polarized in a direction (e.g., y) perpendicular to the blocking direction (e.g., x) and is therefore transmitted by QWP2 as light 250.

The process described above, however, is an idealized version of reality. There can be other less ideal light paths in PLB 102 due to imperfections in PLB 102 and these imperfections can cause light leakage, ghost images, and so forth. In theory, light leakage can be eliminated, but in reality the wavelength of light varies (e.g., over the visible spectrum) and a retardance of a waveplate (e.g., QWP1 and QWP2) is a function of wavelength and varies with wavelength. Accordingly, a quarter-waveplate may not in reality be able to provide a quarter-wave retardance over all possible wavelengths of light falling incident thereon.

For example, if QWP1 produces elliptically polarized light instead of circularly polarized light, QWP2 will transmit elliptically polarized light instead of linearly polarized light. In which case, at least some light 225 will leak through POL2 in the $1^{st}$ straight through path rather than reflect from POL2, as described above. This can be a problem, for example, when using a broadband light source, such as a color display with common non-broadband quarter-waveplates (e.g., a quarter-waveplates provides quarter-wave retardance for light propagating in a specific direction(s) at a designed wavelength(s)). When light with a wavelength outside of the designed wavelength (and/or outside of the designed incident angle) propagates through the quarter-waveplate, the polarization of the output light is altered away from the designed polarization state(s), as shown in FIG. 2. Other leakages caused by other imperfections also exist; however, the straight through path is associated with the highest amount of light leakage.

Figure 3A:
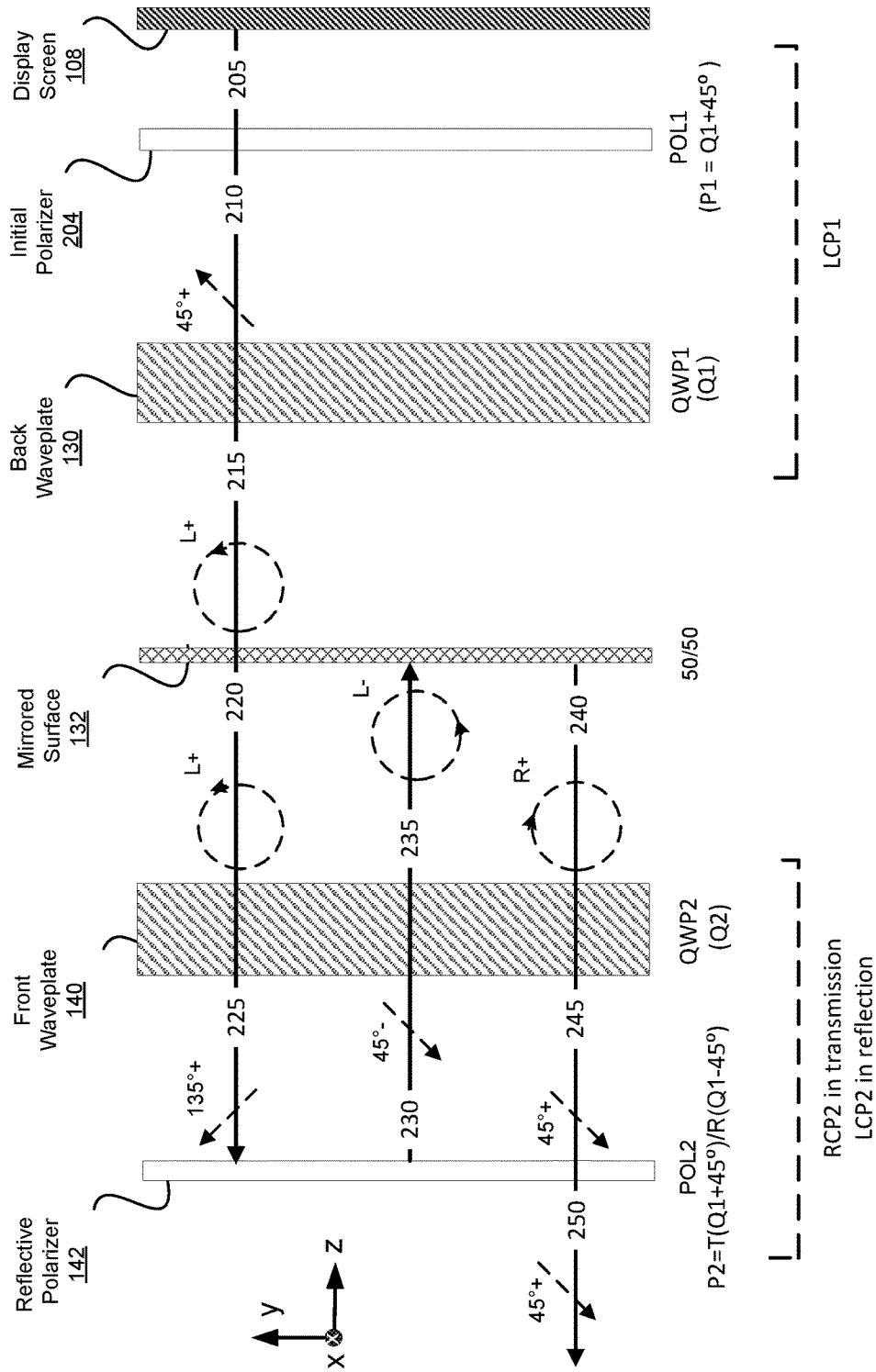
FIG. 3A shows a pancake lens block with polarizing elements that have no orientation specification between the display polarizing components and the pancake lens block polarizing components, in accordance with one embodiment.
Figure 3B:
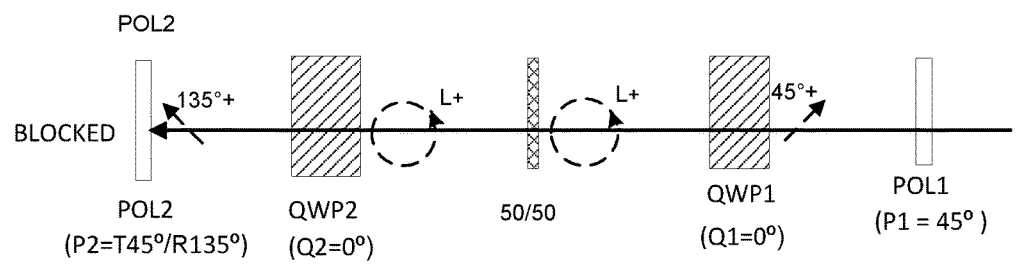
FIG. 3B shows a pancake lens block configuration (aligned to produce the most polarization leakage with wavelength and ray angle) that properly blocks light during a first straight-through path at the designed wavelength (so both waveplates are quarter-waveplates), in accordance with one embodiment.
Figure 3C:
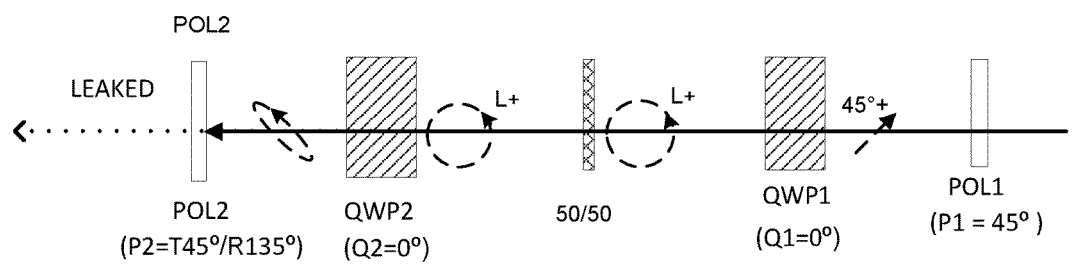
FIG. 3C shows a pancake lens block configuration (aligned to produce the most polarization leakage with wavelength and ray angle) that improperly leaks light during a first straight-through path for other wavelength (so both waveplates are not quarter-waveplates), in accordance with one embodiment.

FIG. 3A shows a pancake lens block with polarizing elements where no specific orientation requirement has been imposed on the relative orientation between QWP2+POL2 and QWP1+POL1. Here, POL1+QWP1 together effectively operate as a left circular polarizer (LCP1) passing left circularly polarized light. QWP2+POL2 together effectively operate as a right circular polarizer (RCP2) passing right circularly polarized light in transmission and as a left circular polarizer (LCP2) passing left circularly polarized light in reflection. Accordingly, the polarized light between QWP1 and QWP2 is circularly polarized. Initially, the configuration shown in FIG. 3A appears to work for any value of Q1 and Q2, as long as P1 is ±45° relative to Q1 and P2 is ±45° relative to Q2, where P1, P2, Q1, and Q2 denote the axis values of POL1, POL2, QWP1, and QWP2, respectively. Here, QWP1 produces circularly polarized light for the designed wavelength at the designed angle. In general, this circularly polarized light will be blocked by QWP2+POL2 regardless of the orientation of Q2, as long as Q2 is orientated 45° relative to P2, as shown in FIG. 3B. However, since the QWP1 and QWP2 do not provide a quarter-wave retardance for other wavelengths, light with a different wavelength will leak through, as shown in FIG. 3C.

Figure 4:
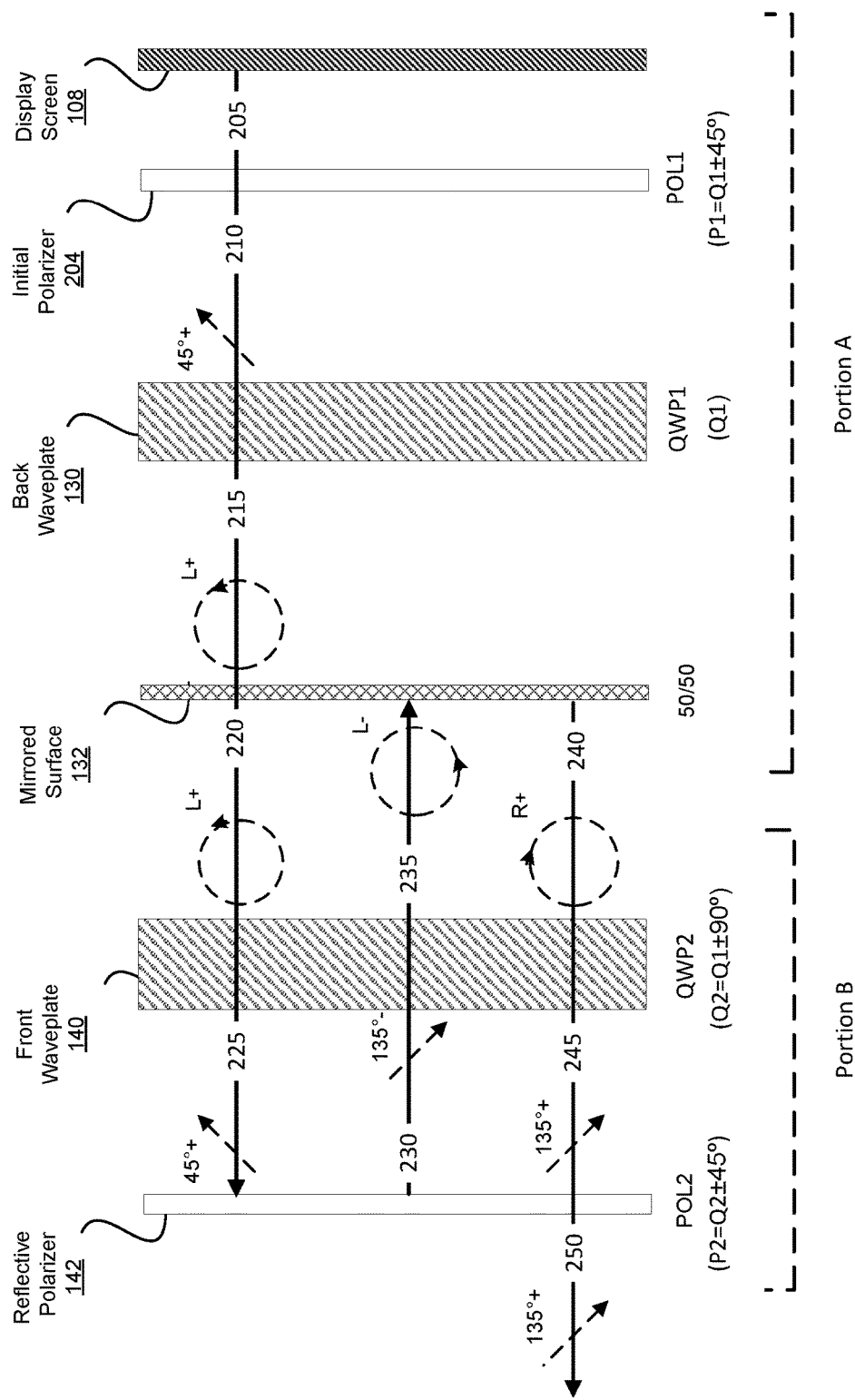
FIG. 4 shows a pancake lens block with polarizing elements that have an orthogonal orientation relative to each other, in accordance with one embodiment.

Accordingly, one way to at least reduce leakage is to consider the relative orientation between Q1 and Q2. Rather than aligning QWP1 with QWP2 in this example, which effectively results in a half-waveplate that rotates 45° linearly polarized incident light to 135° linearly polarized light, as shown in FIG. 3A, QWP2 is provided orthogonal to QWP1, as shown in FIG. 4. In this configuration, QWP2 undoes the retardance induced by QWP1 and, thereby, returning the 45° linearly polarized incident light back to 45° linearly polarized light for all wavelengths. Then this fixed linearly polarized light at 45° is reflected by POL2, and no light leaks through. More precisely, LCP1 and RCP2 are crossed in transmission for all wavelengths.

Figure 5A:
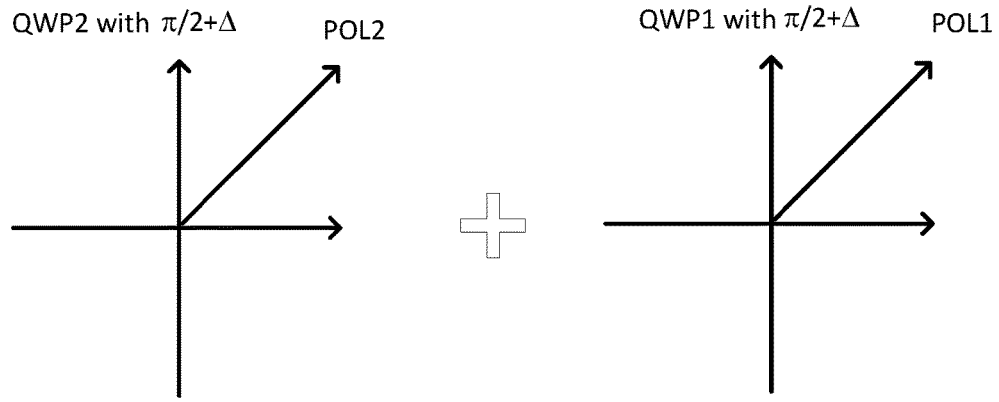
FIG. 5A shows polarization orientation of a pancake lens block with polarizing elements that have an orientation specification which produces the most polarization leakage with wavelength and ray angle, in accordance with one embodiment.

Another way to understand the configuration shown in FIG. 5A is to consider that each quarter-waveplate (i.e., QWP1 and QWP2) has two optical properties: retardance magnitude (e.g., quarter-waveplates, in this example) and fast axis orientation defined at 0° or 90°, for example. Accordingly, the polarizing effects of these properties can cancel each other when QWP1 and QWP2 are oriented orthogonal to each other. When the fast axis of QWP1 at P1 is parallel to the fast axis of QWP2 at P2, the retardance is effectively additive, and the spectral dispersion effect from the quarter-waveplates increases. The induced leakage of such imperfect quarter-waveplates in PLB 102 is, thus, proportional to $\cos^2(\pi/2+\Delta)$, where $\pi/2$ is the quarter-wave, and $\Delta$ is the retardance error. Thus, a 15° retardance variation of $\Delta$ will result in a light leakage of 6.7%, for example, which would significantly degrade the image contrast as well as create ghost images.

Figure 5B:
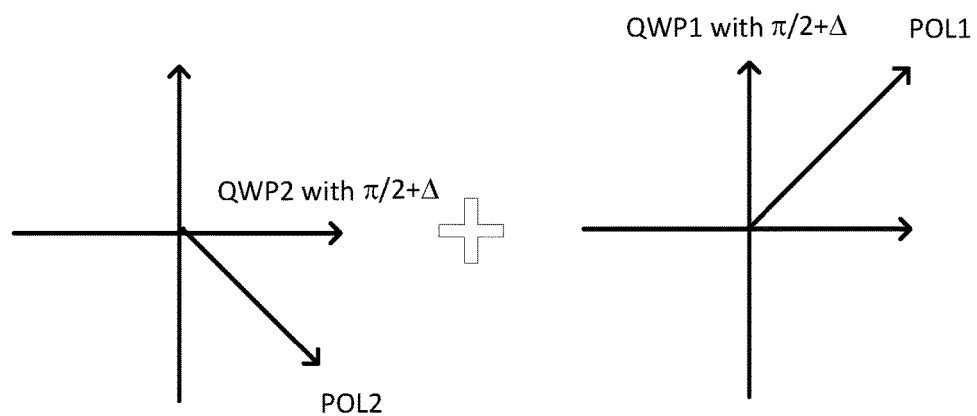
FIG. 5B shows polarization orientation of a pancake lens block with polarizing elements that have an orthogonal orientation relative to each other which produces the least polarization leakage with wavelength and ray angle, in accordance with one embodiment.

Alternatively, referring to FIG. 5B, if the fast axis for QWP1 at P1 is set orthogonal to the fast axis of QWP2 at P2, the retardance subtracts, including the error $\Delta$ of both QWP1 and QWP2. Thus, the dispersion effect of the combined QWPs in this arrangement is zero. The resultant linearly polarized light after QWP2 is the same as the light incident on QWP2. Since transmission axis of POL2 is now orthogonal to POL1, the resultant linearly polarized light will not transmit through POL2.

Mathematical Support

Figure 6:
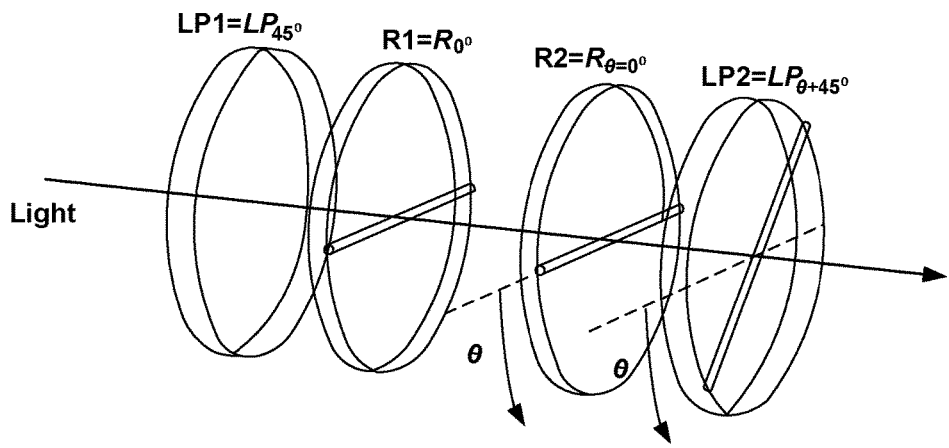
FIG. 6 shows example components of a pancake lens block, in accordance with one embodiment.

Referring to FIG. 6, Jones matrices representing linear polarizer oriented at 45°, $LP_{45°}$, and retarder with retardance, $\delta$, oriented at 0°, $R_{0°}$ are:

$$LP_{45°} = \begin{pmatrix} 1/2 & 1/2 \\ 1/2 & 1/2 \end{pmatrix} \quad (1)$$

$$R_{0°}(\delta) = \begin{pmatrix} e^{i\delta/2} & 0 \\ 0 & e^{-i\delta/2} \end{pmatrix} \quad (2)$$

Thus, $$R_{0°}(\delta) \cdot LP_{45°} = \begin{pmatrix} e^{i\delta/2} & 0 \\ 0 & e^{-i\delta/2} \end{pmatrix} \cdot \begin{pmatrix} 1/2 & 1/2 \\ 1/2 & 1/2 \end{pmatrix} = \begin{pmatrix} e^{i\delta/2}/2 & e^{i\delta/2}/2 \\ e^{-i\delta/2}/2 & e^{-i\delta/2}/2 \end{pmatrix} \quad (3)$$

$$LP_{45°} \cdot R_{0°}(\delta) = \begin{pmatrix} 1/2 & 1/2 \\ 1/2 & 1/2 \end{pmatrix} \cdot \begin{pmatrix} e^{i\delta/2} & 0 \\ 0 & e^{-i\delta/2} \end{pmatrix} = \begin{pmatrix} e^{i\delta/2}/2 & e^{-i\delta/2}/2 \\ e^{i\delta/2}/2 & e^{-i\delta/2}/2 \end{pmatrix} \quad (4)$$

The clocking between QWP1 and QWP2 is specified by $\theta$. Accordingly, the Jones matrices can be rotated by a rotation matrix to represent the resultant Jones matrices for varying clocking. Thus, operation $Rot(\theta) \cdot J \cdot Rot(\theta)^T$ rotates a Jones matrix J by $\theta$, where:

$$Rot(\theta) = \begin{pmatrix} \cos\theta & -\sin\theta \\ \sin\theta & \cos\theta \end{pmatrix} \quad (5)$$

is a 2D rotation matrix. Thus, the rotated Jones matrix of $[LP_{45°} \cdot R_{0°}(\delta)]$ is:

$$Rot(\theta) \cdot [LP_{45°} \cdot R_{0°}(\delta)] \cdot Rot(\theta)^T = \quad (6)$$

$$\begin{pmatrix} e^{-i\delta/2}(\cos\theta - \sin\theta)(e^{i\delta}\cos\theta - \sin\theta)/2 & e^{-i\delta/2}(\cos\theta - \sin\theta)(\cos\theta + e^{i\delta}\sin\theta)/2 \\ e^{-i\delta/2}(\cos\theta + \sin\theta)(e^{i\delta}\cos\theta - \sin\theta)/2 & e^{-i\delta/2}(\cos\theta + \sin\theta)(\cos\theta + e^{i\delta}\sin\theta)/2 \end{pmatrix}$$

Accordingly, the overall Jones matrix for this straight through path is:

$$LP2 \cdot R2 \cdot R1 \cdot LP1 = \{Rot(\theta) \cdot [LP_{45°} \cdot R_{0°}(\delta)] \cdot Rot(\theta)^T\} \cdot [R_{0°}(\delta) \cdot LP_{45°}] \quad (7)$$

$$= \frac{1}{2}\cos\delta\cos\theta \begin{pmatrix} 1 & 1 \\ 1 & 1 \end{pmatrix}.$$

The electric field of the on-axis exiting light from the straight through path is always 45° linearly polarized with a magnitude proportional to $\cos\delta\cos\theta$. So, the exiting irradiance is $\cos^2\delta\cos^2\theta$. This exiting irradiance becomes zero when either $\delta$ or $\theta$ are) ($\pm 90° \pm N \times 180°$, where N is integer 0, $\pm 1$, $\pm 2$ . . . .

Figure 7A:
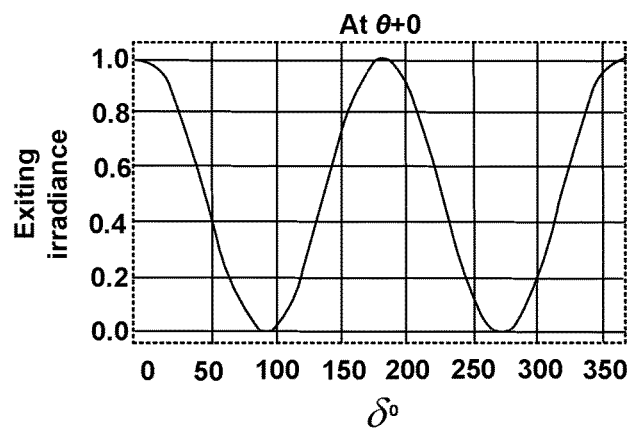
FIG. 7A, which shows how the exiting irradiance varies as function of retardance of the two waveplates when the clocking angle θ=0, in accordance with one embodiment.

Accordingly, the retardance $\delta$ of a retarder or waveplate varies with thickness and wavelength. It is often difficult to have a waveplate produce constant retardance through wavelength and angle. When $\delta$ varies, the exiting irradiance of the straight through path varies. Consider clocking $\theta=0°$ where both linear polarizer are oriented at 45° and both retarders are oriented at 0°. When the retardance magnitude $\delta$ of both retarders varies with the same amount, the exiting irradiance also varies, as shown in FIG. 7A, which shows how the exiting irradiance varies as function of retardance of the two quarter-waveplates when the clocking angle $\theta=0$. The path only produces zero exiting irradiance when $\delta=\pm 90° \pm N \times 180°$, where N is integer 0, 1, 2 . . . . Conventional designs first design the system for one wavelength, and then costly optical films are designed to flatten the retardance vs. wavelength curve and retardance vs angle curve. In this case, seeking quarter-waveplates or waveplates with $\delta=90°$ across wavelength and angle would be the next step to improve contrast in conventional design.

Figure 7B:
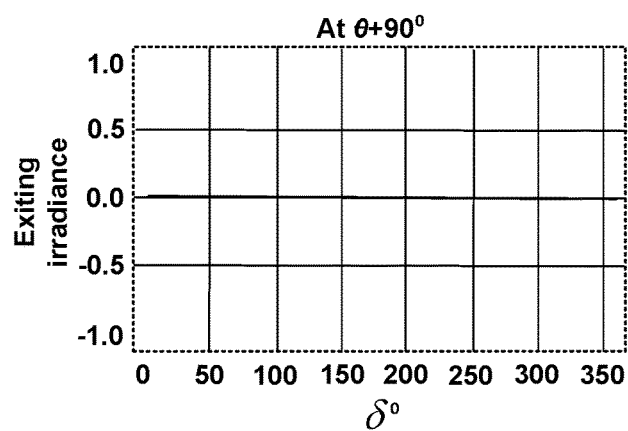
FIG. 7B shows exiting irradiance as function of retardance of the two waveplates when the clocking angle θ=90°, in accordance with one embodiment.

Another way to control the exiting irradiance is the orientation $\theta$ of QWP2 and POL2. In practice, using orientation $\theta$ to produce zero exiting irradiance is a lot easier than adjusting the retardance $\delta$ of a waveplate. This is because $\theta$ does not vary with wavelength while retardance is highly sensitive to the wavelength and incident light angle. As long as $\delta$ is the same for both retarders, a zero exiting irradiance always results with $\theta=90°$, because $\cos\delta\cos\theta=\cos\delta\cos 90°=0$. Accordingly, FIG. 7B shows exiting irradiance as function of retardance of the two QWPs when the clocking angle $\theta=90°$. The exiting irradiance varies the most as function of $\delta$ when $\theta=0°$, 180°, and 360°, but stays zero when $\theta=90°$ and 270°. Thus, when the retardance $\delta$ of a waveplate is varying with wavelength, the exiting irradiance with the $\theta=90°$ clocking will stays at zero.

Quarter-Waveplate Curvature

In order to achieve high contrast and minimize stray light over various angles and wavelengths, the curvature of the QWP1 and QWP2 for curved embodiments of PLB 102 are similar. Matching or similar curvatures between QWP1 and QWP2 allows retardance dispersion compensation to be attained by matching the ray angles between QWP1 and QWP2.

Figure 8B:
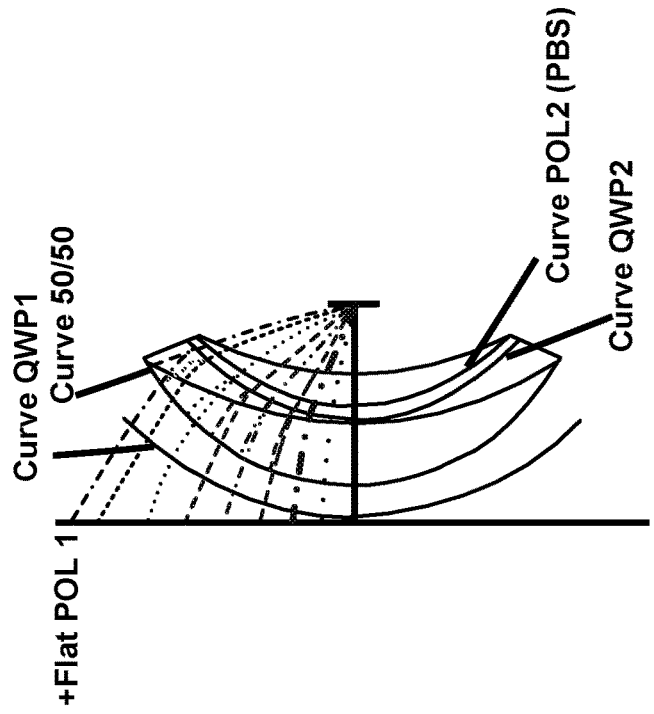
FIG. 8B shows large FOV pancake lens system where both QWP1 and QWP2 are curved, in accordance with one embodiment.
Figure 8A:
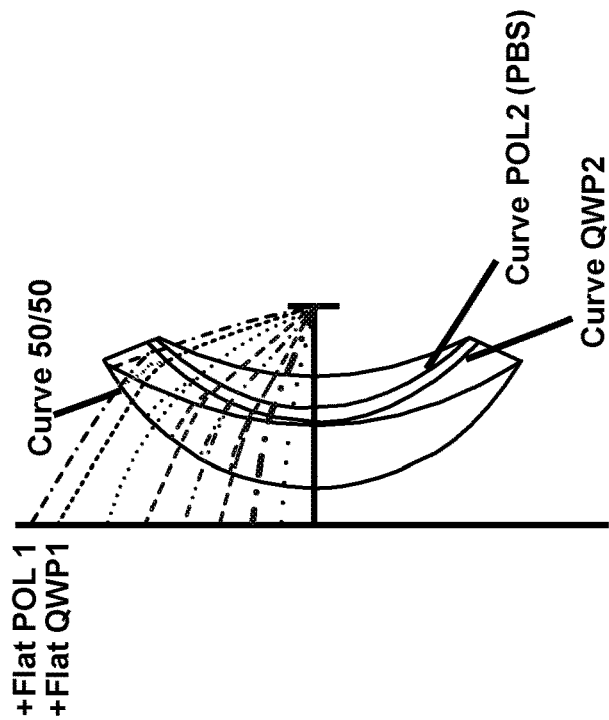
FIG. 8A shows a large FOV pancake lens system with a flat QWP1 and a curved QWP2, in accordance with one embodiment.

FIGS. 8A and 8B show a comparison between pancake lens systems with a flat QWP1 and a curved QWP1. Accordingly, the goal is to have the ray angle at QWP1 be close to (if not the same) as the ray angle at QWP2, which can be achieved by curving QWP1. FIG. 8A shows a pancake lens system with a flat QWP1 and a curved QWP2 and FIG. 8B shows pancake lens system where both QWP1 and QWP2 are curved. Both plots show rays propagate at 9 field angles in an intended ray path. Accordingly, the curved QWP1 not only boosts the intended throughput of the system, but also suppresses stray light and improves the overall contrast by almost two fold.

Figure 9A:
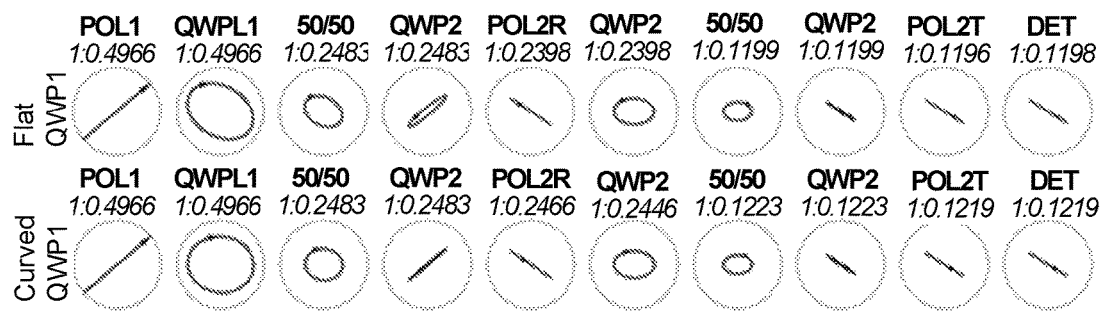
FIG. 9A shows polarization and intensity evolution of a ray along the intended ray path of both systems, in accordance with one embodiment.
Figure 9B:
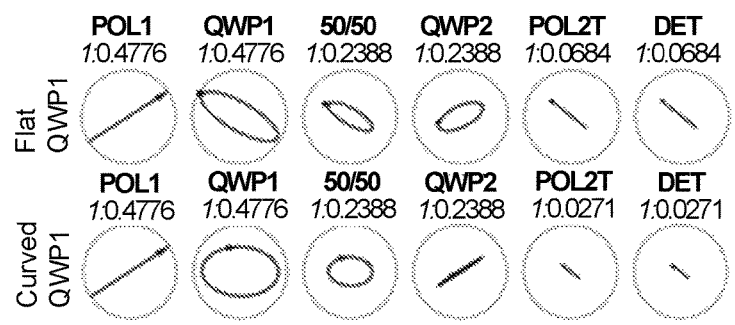
FIG. 9B shows polarization and intensity evolution of a ray along one of the unintended ray path, in accordance with one embodiment.

The importance of the two QWPs alignment is examined by the polarization evolution and the intensity along each ray path, including the intended ray path as well as all other unintended ray paths. Here, the polarization and intensity of an off-axis ray in the intended and unintended (stray light) ray path through both systems are shown in FIGS. 9A and 9B, respectively. FIG. 9A shows polarization and intensity evolution of a ray along the intended ray path of both systems. Here, where high throughput is desirable, the ellipticity at the first row fourth column (QWP2) results from the retardance mismatch between QWP1 and QWP2 decreases the overall throughput.

FIG. 9B shows polarization and intensity evolution of a ray along one of the unintended ray path (stray light path) of both systems. Here, where low leakage is desirable, the ellipticity at the first row fourth column (QWP2) again results from the retardance mismatch between QWP1 and QWP2 increases the leakage two and a half time when compared to the system with curved QWP1. Similar results are also observed for different colors. Therefore, QWP1 with a matching curvature with QWP2 will likely increase intended throughput, minimize stray light, and thus boost contrast.

System Overview

Figure 10:
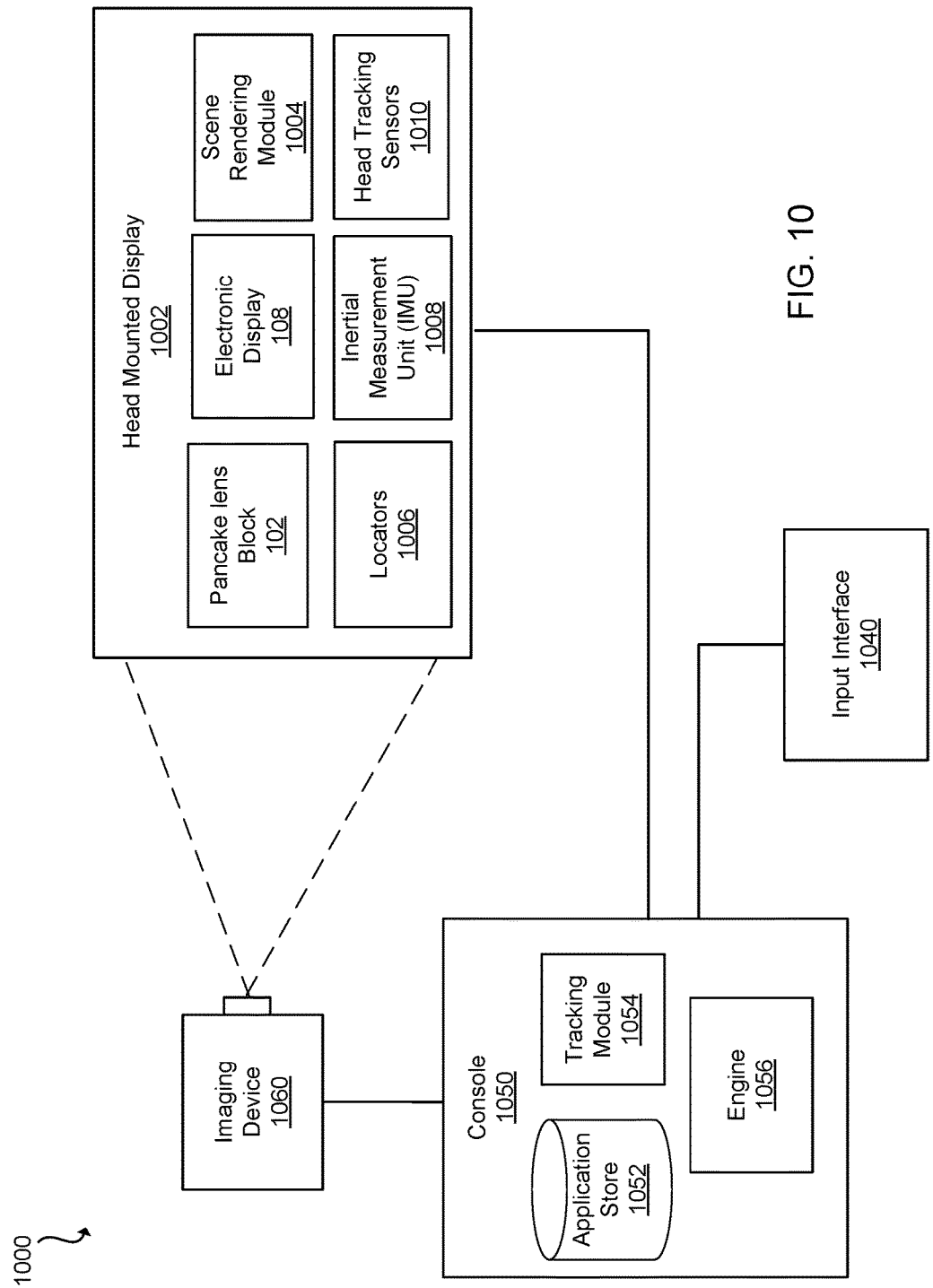
FIG. 10 is a system environment in which a HMD with a pancake lens operates, in accordance with at least one embodiment.

FIG. 10 is a block diagram of system environment 1000 including HMD 1002 that includes PLB 102. System environment 1000 shown by FIG. 10 comprises HMD 1002, imaging device 1060, and an input interface 1040 that are each coupled to the console 1050. While FIG. 10 shows an example system 1000 including one HMD 1002, one imaging device 1060, and one input interface 1040, in other embodiments any number of these components may be included in the system 1000. For example, there may be multiple HMD 1002 each having an associated input interface 1040 and being monitored by one or more imaging devices 1060, with each HMD 1002, input interface 1040, and imaging devices 1060 communicating with the console 1050. In alternative configurations, different and/or additional components may be included in the system environment 1000. The system 1000 may operate in a system environment, an augmented reality (AR) system environment, a mixed reality (MR) system environment, or some combination thereof.

HMD 1002 presents content to a user. Example content includes images, video, audio, or some combination thereof. Audio content may be presented via a separate device (e.g., speakers and/or headphones) external to HMD 1002 that receives audio information from HMD 1002, console 1050, or both. HMD 1002 includes PLB 102, electronic display 108, locators 1006, internal measurement unit (IMU) 1008, head tracking sensors 1010, and scene rendering module 1004. In some embodiments, the HMD 1002 may present VR, AR, MR, or some combination thereof to a user. In the AR and/or MR embodiments, the HMD 1002 augments views of a physical, real-world environment with computer-generated elements (e.g., images, video, sound, etc.).

Electronic display screen 108 presents visual information (i.e., image light) from an electronic signal. The electronic display screen 108 may be, e.g., a liquid crystal display (LCD), an organic light emitting diode (OLED) display, an active-matrix organic light-emitting diode display (AMOLED), some type of flexible display, or some combination thereof. In some embodiments, electronic display screen 108 includes a linear polarizer or admits light that is linearly polarized.

PLB 102 directs light from electronic display 108 to an exit pupil for viewing by a user using one or more optical elements in addition to the two curved optical elements described in FIGS. 1-2. For example, the one or more optical elements may include apertures, Fresnel lenses, convex lenses, concave lenses, filters, and so forth, and may include combinations of different optical elements. In some embodiments, one or more of the optical elements of PLB 102 may have one or more coatings, such as anti-reflective coatings. Magnification of the image light by PLB 102 allows electronic display 108 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Locators 1006 are objects located in specific positions on HMD 1002 relative to one another and relative to a specific reference point on HMD 1002. Locators 1006 may be a light emitting diode (LED), a corner cube reflector, a reflective marker, a type of light source that contrasts with an environment in which HMD 1002 operates, or some combination thereof. Active locators 1006 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 1006 can be located beneath an outer surface of HMD 1002, which is transparent to the wavelengths of light emitted or reflected by locators 1006 or is thin enough not to substantially attenuate the wavelengths of light emitted or reflected by locators 1006. Further, the outer surface or other portions of HMD 1002 can be opaque in the visible band of wavelengths of light. Thus, locators 1006 may emit light in the IR band while under an outer surface of HMD 1002 that is transparent in the IR band but opaque in the visible band.

IMU 1008 is an electronic device that generates fast calibration data based on measurement signals received from one or more of head tracking sensors 1010, which generate one or more measurement signals in response to motion of HMD 1002. Examples of head tracking sensors 1010 include accelerometers, gyroscopes, magnetometers, other sensors suitable for detecting motion, correcting error associated with IMU 1008, or some combination thereof. Head tracking sensors 1010 may be located external to IMU 1008, internal to IMU 1008, or some combination thereof.

Based on the measurement signals from head tracking sensors 1010, IMU 1008 generates fast calibration data indicating an estimated position of HMD 1002 relative to an initial position of HMD 1002. For example, head tracking sensors 1010 include multiple accelerometers to measure translational motion (forward/back, up/down, left/right) and multiple gyroscopes to measure rotational motion (e.g., pitch, yaw, and roll). IMU 1008 can, for example, rapidly sample the measurement signals and calculate the estimated position of HMD 1002 from the sampled data. For example, IMU 1008 integrates measurement signals received from the accelerometers over time to estimate a velocity vector and integrates the velocity vector over time to determine an estimated position of a reference point on HMD 1002. The reference point is a point that may be used to describe the position of HMD 1002. While the reference point may generally be defined as a point in space, in various embodiments, reference point is defined as a point within HMD 1002 (e.g., a center of the IMU 1008). Alternatively, IMU 1008 provides the sampled measurement signals to console 1050, which determines the fast calibration data.

IMU 1008 can additionally receive one or more calibration parameters from console 1050. As further discussed below, the one or more calibration parameters are used to maintain tracking of HMD 1002. Based on a received calibration parameter, IMU 1008 may adjust one or more IMU parameters (e.g., sample rate). In some embodiments, certain calibration parameters cause IMU 1008 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 1004 receives content for the virtual scene from engine 1056 and provides the content for display on electronic display 1002. Additionally, scene render module 1004 can adjust the content based on information IMU 1008 and head tracking sensors 1010. For example, upon receiving the content from engine 1056, scene render module 1004 adjusts the content based on the predicted state (i.e., eye position and focal length) of PLB 102 received from focus prediction module 1008. Additionally, scene render module 1004 determines a portion of the content to be displayed on electronic display 1002 based on one or more of tracking module 1054, head tracking sensors 1010, or IMU 1008, as described further below.

Imaging device 1060 generates slow calibration data in accordance with calibration parameters received from console 1050. Slow calibration data includes one or more images showing observed positions of locators 1006 that are detectable by imaging device 1060. Imaging device 1060 may include one or more cameras, one or more video cameras, other devices capable of capturing images including one or more locators 1006, or some combination thereof. Additionally, imaging device 1060 may include one or more filters (e.g., for increasing signal to noise ratio). Imaging device 1060 is configured to detect light emitted or reflected from locators 1006 in a field of view of imaging device 1060. In embodiments where locators 1006 include passive elements (e.g., a retroreflector), imaging device 1060 may include a light source that illuminates some or all of locators 1006, which retro-reflect the light towards the light source in imaging device 1060. Slow calibration data is communicated from imaging device 1060 to console 1050, and imaging device 1060 receives one or more calibration parameters from console 1050 to adjust one or more imaging parameters (e.g., focal length, focus, frame rate, ISO, sensor temperature, shutter speed, aperture, etc.).

Input interface 1040 is a device that allows a user to send action requests to console 1050. An action request is a request to perform a particular action. For example, an action request may be to start or end an application or to perform a particular action within the application. Input interface 1040 may include one or more input devices. Example input devices include a keyboard, a mouse, a game controller, or any other suitable device for receiving action requests and communicating the received action requests to console 1050. An action request received by input interface 1040 is communicated to console 1050, which performs an action corresponding to the action request. In some embodiments, input interface 1040 may provide haptic feedback to the user in accordance with instructions received from console 1050. For example, haptic feedback is provided by the input interface 1040 when an action request is received, or console 1050 communicates instructions to input interface 1040 causing input interface 1040 to generate haptic feedback when console 1050 performs an action.

Console 1050 provides content to HMD 1002 for presentation to the user in accordance with information received from imaging device 1060, HMD 1002, or input interface 1040. In the example shown in FIG. 10, console 1050 includes application store 1052, tracking module 1054, and engine 1056. Some embodiments of console 1050 have different or additional modules than those described in conjunction with FIG. 10. Similarly, the functions further described below may be distributed among components of console 1050 in a different manner than is described here.

Application store 1052 stores one or more applications for execution by console 1050. An application is a group of instructions, that when executed by a processor, generates content for presentation to the user. Content generated by an application may be in response to inputs received from the user via movement of HMD 1002 or interface device 1040. Examples of applications include gaming applications, conferencing applications, video playback application, or other suitable applications.

Tracking module 1054 calibrates the system using one or more calibration parameters and may adjust one or more calibration parameters to reduce error in determining position of HMD 1002. For example, tracking module 1054 adjusts the focus of imaging device 1060 to obtain a more accurate position for observed locators 1006 on HMD 1002. Moreover, calibration performed by tracking module 1054 also accounts for information received from IMU 1008. Additionally, if tracking of HMD 1002 is lost (e.g., imaging device 1060 loses line of sight of at least a threshold number of locators 1006), tracking module 1054 re-calibrates some or all of the system components.

Additionally, tracking module 1054 tracks the movement of HMD 1002 using slow calibration information from imaging device 1060 and determines positions of a reference point on HMD 1002 using observed locators from the slow calibration information and a model of HMD 1002. Tracking module 1054 also determines positions of the reference point on HMD 1002 using position information from the fast calibration information from IMU 1008 on HMD 1002. Additionally, tracking module 1054 may use portions of the fast calibration information, the slow calibration information, or some combination thereof, to predict a future location of HMD 1002, which is provided to engine 1056.

Engine 1056 executes applications within the system and receives position information, acceleration information, velocity information, predicted future positions, or some combination thereof for HMD 1002 from tracking module 1054. Based on the received information, engine 1056 determines content to provide to HMD 1002 for presentation to the user, such as a virtual scene. For example, if the received information indicates that the user has looked to the left, engine 1056 generates content for HMD 1002 that optical elements or tracks the user's movement in a virtual environment. Additionally, engine 1056 performs an action within an application executing on console 1050 in response to an action request received from the input interface 1040 and provides feedback to the user that the action was performed. The provided feedback may be visual or audible feedback via HMD 1002 or haptic feedback via input interface 1040.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
an electronic display configured to emit image light; and
a pancake lens block comprising:
a back curved optical element configured to receive and focus the image light emitted by the electronic display, the back curved optical element comprising:
a back quarter-wave plate on a back convex surface of the back curved optical element oriented to a first axis of orientation; and
a partially reflective optical element on a front concave surface of the back curved optical element configured to transmit a portion of the image light emitted from the electronic display;
a front curved optical element configured to receive and further focus the transmitted portion of the image light from the partially reflective optical element, the front curved optical element comprising:
a front quarter-wave plate on a back convex surface of the front curved optical element oriented to a second axis of orientation that is orthogonal to the first axis of orientation; and
a polarization sensitive reflective optical element on a front concave surface of the front curved optical element configured to reflect the portion of the light transmitted by the partially reflective optical element back to the partially reflective optical element based on a first polarization state, the partially reflective optical element reflecting a second portion of the light back to the polarization sensitive reflective optical element for transmission by the polarization sensitive reflective optical element to an exit pupil of the HMD based on a second polarization state of the second portion of the light.

2. The HMD of claim 1, wherein the first axis of orientation corresponds to a fast axis of the back quarter-wave plate and the second axis of orientation corresponds to a fast axis of the front quarter-wave plate.

3. The HMD of claim 1, wherein the back quarter-wave plate is located on a surface of a back optical element nearest the electronic display, the back optical element including the back quarter-wave plate and the partially reflective optical element.

4. The HMD of claim 3, wherein the front quarter-wave plate is located on a surface of a front optical element nearest the back curved element, and the polarization sensitive reflective optical element is located on an opposite surface of the front optical element.

5. The HMD of claim 3, wherein the back optical element and the front optical element are curved and the back quarter-wave plate and the front quarter-wave plate have a concentric radius of curvature.

6. The HMD of claim 1, wherein the pancake lens block further comprises:
a back polarizer in optical series with the back quarter-wave plate located between the back quarter-wave plate and the electronic display, the back polarizer having a transmission axis orientated orthogonal to a transmission axis of the polarization sensitive reflective optical element.

7. The HMD of claim 1, wherein the polarization sensitive reflective optical element is configured to:
   transmit light polarized in a direction parallel to a polarization direction of the polarization sensitive reflective optical element, and
   reflect light polarized in a direction perpendicular to the polarization direction.

8. The HMD of claim 1, wherein the back quarter-wave plate and the front quarter-wave plate are cylindrical in shape, and wherein the polarization sensitive reflective optical element is a polarizing beam splitter.

9. A head mounted display (HMD) comprising:
   an electronic display configured to emit image light; and
   a pancake lens block comprising:
      a back curved optical element configured to receive and focus the image light emitted by the electronic display, the back curved optical element comprising:
         a back quarter-wave plate on a back convex surface of the back curved optical element oriented to a first axis of orientation; and
         a partially reflective back optical element on a front concave surface of the back curved optical element configured to transmit a portion of the image light emitted from the electronic display;
      a front curved optical element configured to receive and further focus the transmitted portion of the image light from the partially reflective optical element, the front curved optical element comprising:
         a front quarter-wave plate on a back convex surface of the front curved optical element oriented to a second axis of orientation that is orthogonal to the first axis of orientation and the difference in orientation mitigating leakage of light through the front quarter-wave plate irrespective of wavelength; and
         a front polarization sensitive reflective optical element on a front concave surface of the front curved optical element configured to reflect the portion of the light transmitted by the partially reflective optical element back to the partially reflective back optical element, the partially reflective back optical element reflecting a second portion of the light from the front polarization sensitive reflective optical element back to the front polarization sensitive reflective optical element for transmission to an exit pupil of the HMD.

10. The HMD of claim 9, wherein the first axis of orientation corresponds to a fast axis of the back quarter-wave plate and the second axis of orientation corresponds to a fast axis of the front quarter-wave plate.

11. The HMD of claim 9, wherein the back quarter-wave plate is located on a surface of the back optical element nearest the electronic display, wherein the front quarter-wave plate is located on a surface of the front optical element nearest the back optical element, and the polarized reflector is located on an opposite surface of the front optical element.

12. The HMD of claim 9, wherein the back curved optical element and the front curved optical element have a concentric radius of curvature.

13. The HMD of claim 9, wherein the pancake lens block further comprises:
   a back polarizer in optical series with the back optical element located between the back curved optical element and the electronic display, the back polarizer having a transmission axis orientated orthogonal to a transmission axis of the front polarization sensitive reflective optical element.

14. The HMD of claim 9, wherein the front polarization sensitive reflective optical element is configured to:
   transmit light polarized in a direction parallel to a polarization direction of the front polarization sensitive reflective optical element, and
   reflect light polarized in a direction perpendicular to the polarization direction.

15. A head mounted display (HMD) comprising:
   an electronic display configured to emit image light; and
   a pancake lens block configured to focus light to an exit pupil of the HVID, the pancake lens block comprising:
      a back quarter-wave plate oriented to a first axis of orientation, and is configured to receive image light that is linearly polarized along a first transmission axis, and the back quarter-wave plate is configured to convert the received image light into circularly polarized light;
      a back curved optical element that receives the circularly polarized light from the back quarter-wave plate and optically adjusts the circularly polarized light, the back quarter-wave plate located on a back convex surface of the back curved optical element;
      a front curved optical element comprising:
         a front quarter-wave plate on a back convex surface of the front curved optical element oriented to a second axis of orientation that is orthogonal to the first axis of orientation and is configured to convert the circularly polarized light to the linearly polarized light; and
         a polarized reflector on a front concave surface of the front curved optical element configured to reflect a portion of the linearly polarized light back through the front quarter-wave plate toward the back curved optical element, the back curved optical element reflecting a portion of the light from the front curved optical element back through the front quarter-wave plate and the polarized reflector for transmission to the exit pupil of the HMD.

16. The HMD of claim 15, wherein the first axis of orientation corresponds to a fast axis of the back quarter-wave plate and the second axis of orientation corresponds to a fast axis of the front quarter-wave plate.

17. The HMD of claim 15, wherein the pancake lens block further comprises:
   a back polarizer is optical series with the back curved optical element located between the back curved optical element and the electronic display, the back polarizer having a transmission axis orientated orthogonal to a transmission axis of the polarized reflector.

18. The HMD of claim 15, wherein the polarized reflector is configured to:
   transmit light polarized in a direction parallel to a polarization direction of the polarized reflector, and
   reflect light polarized in a direction perpendicular to the polarization direction.

19. The HMD of claim 15, wherein the back quarter-wave plate and the front quarter-wave plate have a concentric radius of curvature.

* * * * *

UNITED STATES PATENT AND TRADEMARK OFFICE
CERTIFICATE OF CORRECTION

PATENT NO. : 10,394,040 B2
APPLICATION NO. : 15/292108
DATED : August 27, 2019
INVENTOR(S) : Gollier et al.

Page 1 of 1

It is certified that error appears in the above-identified patent and that said Letters Patent is hereby corrected as shown below:

In the Claims

In Column 16, in Claim 15, Line 15, delete "HIVID" and insert -- HMD --, therefor.

Signed and Sealed this
Eighteenth Day of February, 2020

Andrei Iancu
*Director of the United States Patent and Trademark Office*